US006976192B1

(12) United States Patent
Eslambolchi et al.

(10) Patent No.: US 6,976,192 B1
(45) Date of Patent: Dec. 13, 2005

(54) DATA MARKER HAVING RECORD KEEPING ABILITY

(75) Inventors: Hossein Eslambolchi, Basking Ridge, NJ (US); John Sinclair Huffman, Conyers, GA (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/310,297

(22) Filed: May 12, 1999

(51) Int. Cl.[7] .................................................. G06F 11/34
(52) U.S. Cl. ............................ 714/45; 385/137; 385/99
(58) Field of Search ..................... 714/43, 45; 359/110, 359/112; 385/135, 137, 99; 346/44, 150.1; 379/25, 106.03, 106.08, 120

(56) References Cited

U.S. PATENT DOCUMENTS 5,850,388 A * 12/1998 Anderson et al. ........... 370/252
6,088,497 A * 7/2000 Phillips et al. ................ 385/48
6,266,789 B1 * 7/2001 Bucher et al. ................ 714/39
6,282,353 B1 * 8/2001 Clark .......................... 385/99
6,285,475 B1 * 9/2001 Fee ............................ 359/110

* cited by examiner

*Primary Examiner*—Scott T. Baderman
(74) *Attorney, Agent, or Firm*—Robert B. Levy

(57) ABSTRACT

A data marker (20) for use in connection with one or more signal carrying members, such as a fiber optic cables (12–18) includes a carrier (21) that mounts a data storage device (24) that includes a non-volatile memory (26). The memory (26) stores status information about the signal carrying member and any status updates. In a preferred embodiment, the data marker (20) is mounted inside or outside of a splice case (10) to store status information about splices between fibers to enable an outside plant technician to accurately provision service, and to easily update such status information.

7 Claims, 4 Drawing Sheets

FIG. 3A

BLUE BINDER GP EAST

1E---7N
2E---3N
3E---3W
4E---4W
5E---5W
6E---6W
7E---2S
8E---1S
9E---9S
10E---10S
11E---11S
12E---12S

FIG. 3B

BLUE BINDER GP NORTH

1N---
2N---
3N---2E
4N---
5N---
6N---
7N---1E
8N---7W
9N---8W
10N---
11N---
12N---

FIG. 3C

BLUE BINDER GP WEST

1W---
2W---
3W---3E
4W---4E
5W---5E
6W---6E
7W---8N
8W---9N
9W---9E
10W---10E
11W---11E
12W---12E

FIG. 3D

BLUE BINDER GP SOUTH

1S---8E
2S---7E
3S---
4S---
5S---
6S---
7S---
8S---
9S---
10S---
11S---
12S---

DATA MARKER HAVING RECORD KEEPING ABILITY

TECHNICAL FIELD

This invention relates to a device for use in proximity with one or more signal-carrying members (e.g., wires, fibers or cables) to provide information about such members, including information about splices between them.

BACKGROUND ART

Most major providers of telecommunications services, such as AT&T, now rely primarily on optical fiber cables to carry traffic. As compared to copper cables and microwave transmission facilities previously used to carry telecommunication traffic, optical fiber cables offer higher traffic capacity and provide higher quality. Typically, telecommunication providers maintain high capacity fiber routes that run between telecommunications service facilities and lower capacity fiber routes that run between telecommunications facilities and business customers. By comparison, the high capacity routes generally undergo far less maintenance than the lower capacity routes. Such lower capacity routes often require constant re-provisioning because of the increasing demand for telecommunications services by businesses.

In practice, lower capacity routes that serve business customers have a ring configuration with various fiber drops along the ring. Each fiber drop typically serves as a point at which customer traffic enters and exits the ring. Upon a request by a customer for service that may require a change in capacity, an Outside Plant (OSP) technician accesses the ring at a fiber drop and makes one or more splices to provide the desired customer connectivity. To splice the correct fibers to provide the requested connectivity, the technician invariably accesses a splice record, detailing which fibers correspond to particular customers. In the absence of accurate information identifying the fibers corresponding to particular customers, a technician could easily make a mistake, disrupting service.

Traditionally, most telecommunication service providers have maintained paper records containing information about the splices at each fiber drop. Such paper records are cumbersome, and are difficult to maintain and update on a regular basis. More recently, telecommunication service providers have converted such paper records to electronic records stored in a computer database. While electronic record keeping of splice information is less cumbersome, and lends itself to more frequent updating, electronic splice records are not always available to the technician who needs them. Often, the technician must obtain such records at a telecommunications service provider administrative location prior to undertaking any re-provisioning of service.

Some sophisticated providers of the telecommunications service have the capability of transmitting such electronic splice records directly to a terminal within a vehicle operated by the OSP technician. Having the records available at the vehicle does save the OSP technician time, but the technician often must transcribe the electronic record into a paper record to facilitate actual work at the splice location. Errors in transcription can and do occur, leading to possible errors in splicing.

The need to accurately identify attributes of signal carrying members (e.g., wires, fibers and/or cables) also exists other that in connection with splices. In many telecommunications facilities, large numbers of cables, and indeed, large numbers of individual fibers enter and exit various pieces of equipment. While many of such cables and individual fibers do carry physical labels that carry pertinent information, the information content often changes as a result of service re-provisioning. In many instances, the label does not reflect the latest information about the fiber or cable because changes occur far more frequently than frequency at which such labels are updated.

Thus, there is a need for a technique for enabling a technician to obtain and update information about signal-carrying members.

BRIEF SUMMARY OF THE INVENTION

Briefly, the present invention concerns a data marker comprised of an enclosure adapted for physical attachment directly to a signal-carrying member, or to a housing, such as a splice case that itself encloses one or more signal carrying members. The enclosure of the data marker contains a data storage device for storing information about the signal carrying member, such as for example, the identity of those signal carrying members that are spliced together. In practice, the data storage device has the capability of writing (outputting) the stored information about the signal carrying member(s), such as the identity of splices between members. Additionally, the data storage device can read information input by the technician regarding subsequent splices or other changes associated with the signal-carrying member(s). In this way, a technician accessing the data storage device can always obtain the most recent information.

BRIEF DESCRIPTION OF THE DRAWINGS

FIGS. 3A–3D depicts tabular splice information stored by the data marker of FIG. 1

DETIALED DESCRIPTION

Figure 1A:
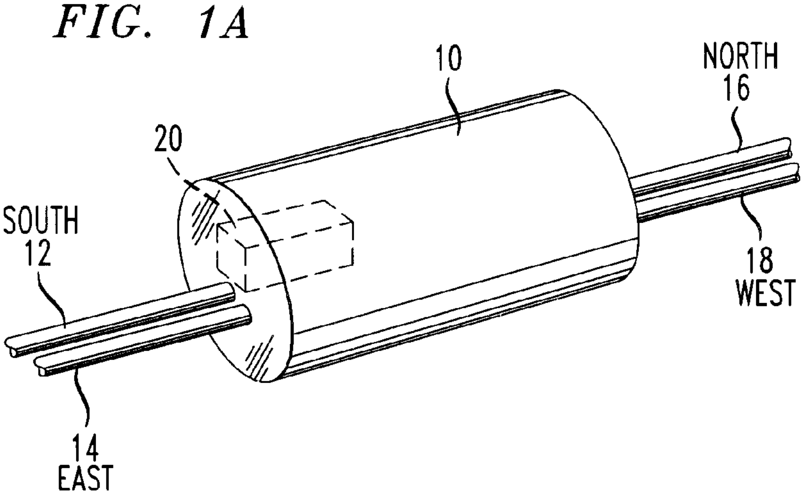
FIG. 1 depicts a perspective view of a splice case containing a data marker in accordance with the present invention.
Figure 1B:
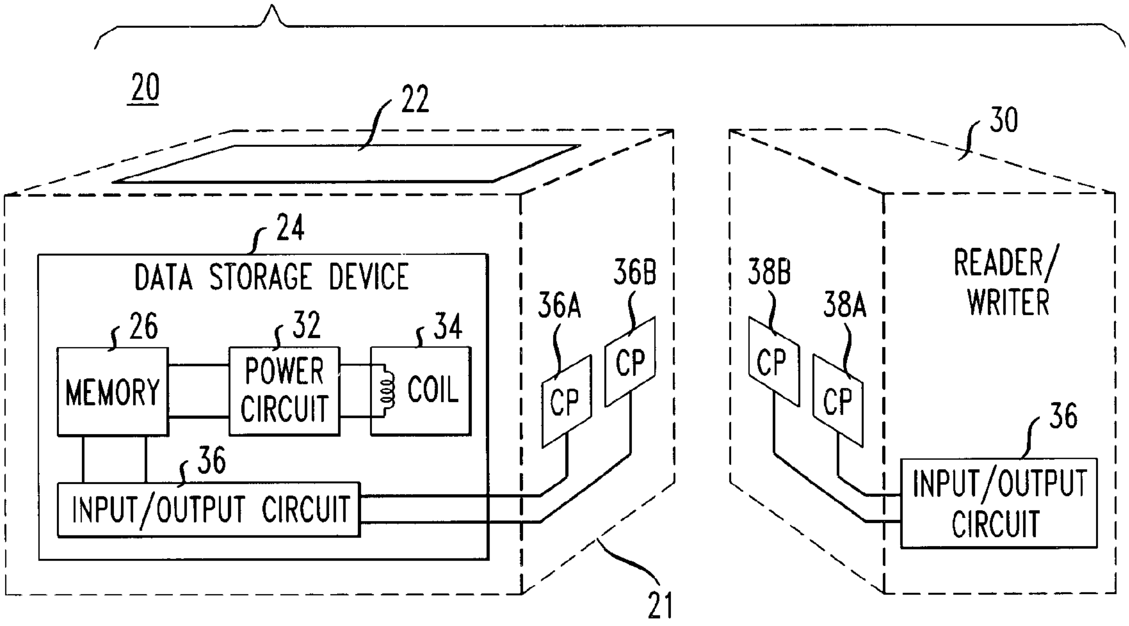

FIG. 1 illustrates an enclosure 10, in the form of a splice case for enclosing a terminating end of cables 12, 14, 16 and 18 that each contain a plurality of signal-carrying members (not shown). In the exemplary embodiment, the cables 12–18 comprise optical fiber cables that typically contain twelve optical fibers apiece, although each cable could easily contain a larger or smaller number of fibers. The splice case 10 is typically manufactured from a material that is substantially impervious to the elements and thus serves to enclose and protect the splices between the fibers of the cables 12–18.

Figure 2:
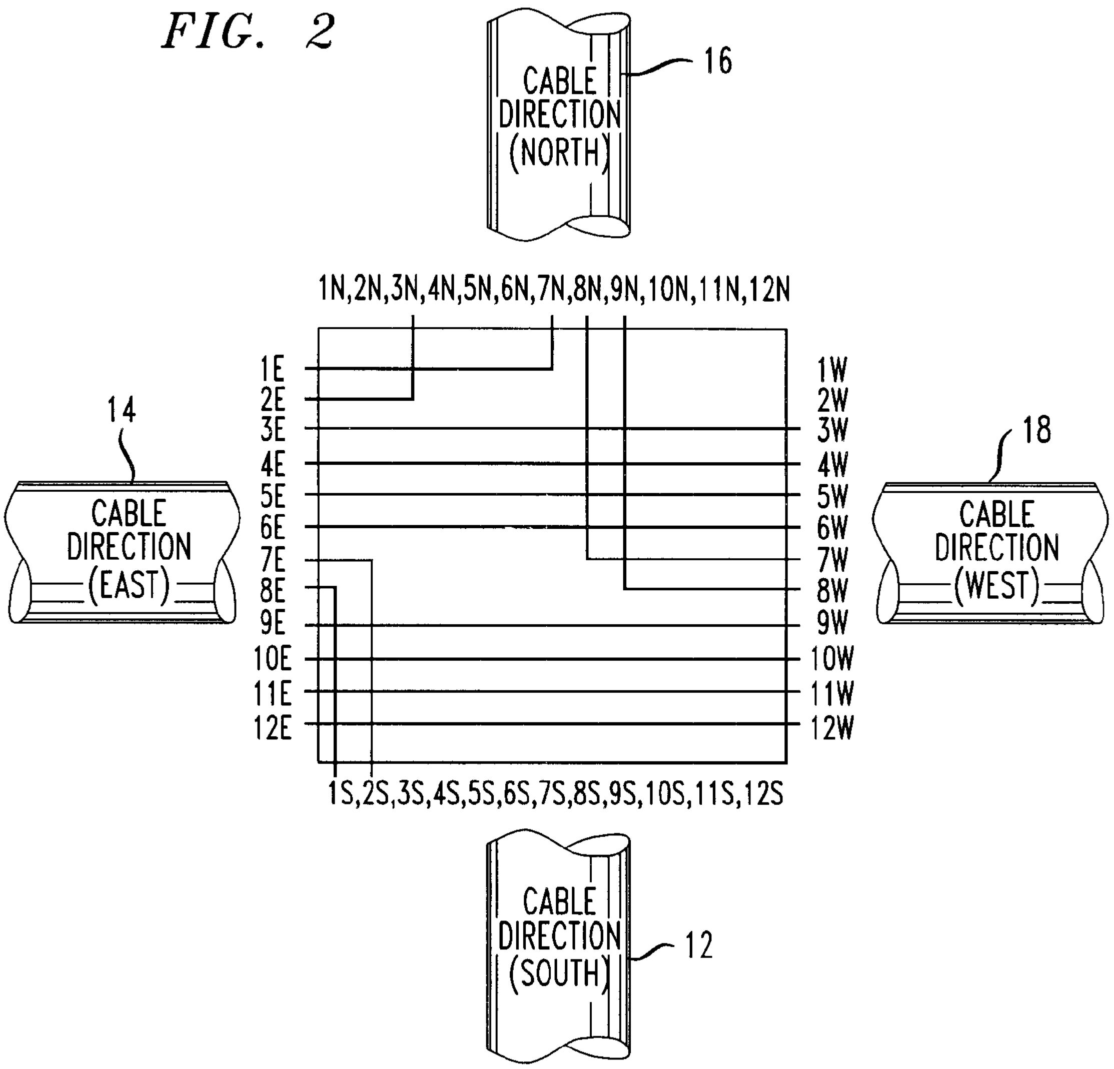
FIG. 2 depicts a chart showing exemplary splices within the enclosure of FIG. 1.

FIG. 2 depicts schematic diagram of the splices between the fibers of the cables 12–18. In the exemplary embodiment, the cables 12–18 run south, east, west and north, respectively, and are labeled accordingly. Using the geographic direction (S, E, W and N) as identifiers, the individual twelve fibers of cables 12, 14, 16, and 18 are referenced as 1S, 2S, 3S, 4S, 5S, 6S, 7S, 8S, 9S, 10S, 11S and 12S, 1E, 2E, 3E, 4E, 5E, 6E, 7E, 8E, 9E, 10E, 11E and 12E, 1W, 2W, 3W, 4W, 5W, 6W, 7W, 8W, 9W, 10W, 11W and 12W, and 1N, 2N, 3N, 4N, 5N, 6N, 7N, 8N, 9N, 10N, 11N and 12N, respectively. As shown in FIG. 2, the fibers 1E, 2E, 3E, 4E, 5E, 6E, 7E, 8E, 9E, 10E, 11E and 12E are spliced to the fibers 7N, 3N, 3W, 4W, 5W, 6W, 2S, 1S, 9S, 10S, 11S and 12S, respectively.

When adding new service, or terminating existing service for a customer, an outside plant (OSP) technician will need to make new splices, and/or alter existing splices between the fibers of the cables 12–18. To properly provision the requested service, the OSP technician must have an accurate knowledge of existing splices to avoid making a mistake that could inadvertently disconnect existing service. Mistakenly altering service on the wrong fiber usually has disastrous consequences, especially since a single fiber can carry a large volume of traffic. Traditional paper records of fiber splices are kept by hand and often do not reflect the current splice status, thus making mistakes inevitable. While electronic records are usually kept more up-to-date, a technician must usually transcribe the electronic records into a paper format to have such records available at the site of the splices, also giving rise to errors.

In accordance with the invention, the splice case 10 includes a data marker 20 that stores information indicative of the signal carrying members (e.g., the fibers) in the cables 12–18. The data marker 20 has the capability of writing (outputting) stored information to allow an outside plant (OSP) technician to gather information about the spliced signal carrying members, and the marker has the capability of reading (inputting) and storing information entered by the technician about newly made splices. The data marker 20 comprises a carrier 21 typically made of an impervious material (e.g., plastic or aluminum) which, in the preferred embodiment, takes the form of a box or the like having fastening means 22, for example, a strip of adhesive, for attachment to the inside or outside of the splice case 10.

The carrier 21 carries a data storage device 24 that includes an electronic non-volatile memory 26, typically an electronically programmable read-only memory (EPROM) or an electronically alterable read-only memory (EAROM) having the capability of both reading and writing information without the need for constant refreshing. In other words, the memory 26 has the capability of retaining information for long periods of time without the need for any electrical energy to refresh the memory.

In the illustrated embodiment, the electronic marker 20 operates to write data to, as well as read data from a reader/writer 30 without any direct connection therebetween. To facilitate such "connectionless" operation, the data storage device 24 includes a power circuit 32, typically in the form of a rectifier-capacitor combination (not shown). The power circuit 30 converts into direct current the alternating current induced in a coil 34 of the data storage device 24 from a coil 36 in the reader/writer 30.

Additionally, the data storage device 20 further includes an input/output circuit 36 that operates to read data from the memory 26 and to place a charge onto each of a pair of capacitive plates **36*a* and 36*b* in accordance with such read data, as well as to write data into the memory in accordance with the charge on the plates. The plates 36*a* and 36*b* serve to transfer a electrical charge to, and receive charge from, a corresponding pair of capacitive plates 38*a* and 38*b* on the reader/writer 30 connected to circuitry (not shown) within the reader/writer similar to the input/output circuit 34 of the data storage device 24. The capacitive plates 36*a* and 36*b* associated with the data storage device 20 and the plates 38*a* and 38*b* on the reader/writer 30 allow data transfer between memory 26 of the data storage device 24 and the reader/writer 30 that may include its own intelligence, in the form of an associated microprocessor (not shown) or enjoy a connection to a separate computer (not shown), such as a lap top computer having an associated display. In this way, the reader/writer 30 can read the contents of the memory 26** for display to the technician and write information to the memory for subsequent storage.

While the data storage device 24 of the data marker 20 operates in a connectionless manner to transfer day the capacitive plates **36*a* and 36*b* , data transfer to and from the memory 26 could easily occur using induction. Further data transfer could occur via a direct wired connection, obviating the need for the power circuit 25, the coil 26, the input/output circuit 28, and the plates 36*a* and 36*b* . However, connectionless operation of the data storage device 20 is generally preferable, thereby avoiding difficulties in making reliable electrical contact with the data storage device 24**.

In operation, an OSP technician will affix the data marker 20 of the invention either inside or outside of the splice case 10 typically upon initial installation of the splice case. (Alternatively, attachment of the data marker 20 to the splice case 10 could occur as part of the splice case fabrication process.) Once attached, the technician will initially program the memory 26 by writing information thereto via the reader/writer 30 or some other device to store information about the splices within the splice case 10. FIGS. 3A–3D depict exemplary splice information stored in the memory 26 for the fibers of the cables 14, 16, 18, and 12, respectively as they exist initially.

When the OSP technician needs to re-provision service by altering one or more of the splices within the splice case 10, the technician will utilize the reader/writer 30, typically in connection with a display device (not shown) or with a lap top computer or the like (not shown) to read the contents of the memory 26. In this way, the technician obtains the most current splice status. After making the necessary alternations, the technician will then write status updates to the memory 26 with the aid of the reader/writer 30 so that the memory now contains the most recent splice information. In this way, another technician that needs to make subsequent splice alterations will know the most recent splice information.

Figure 4:
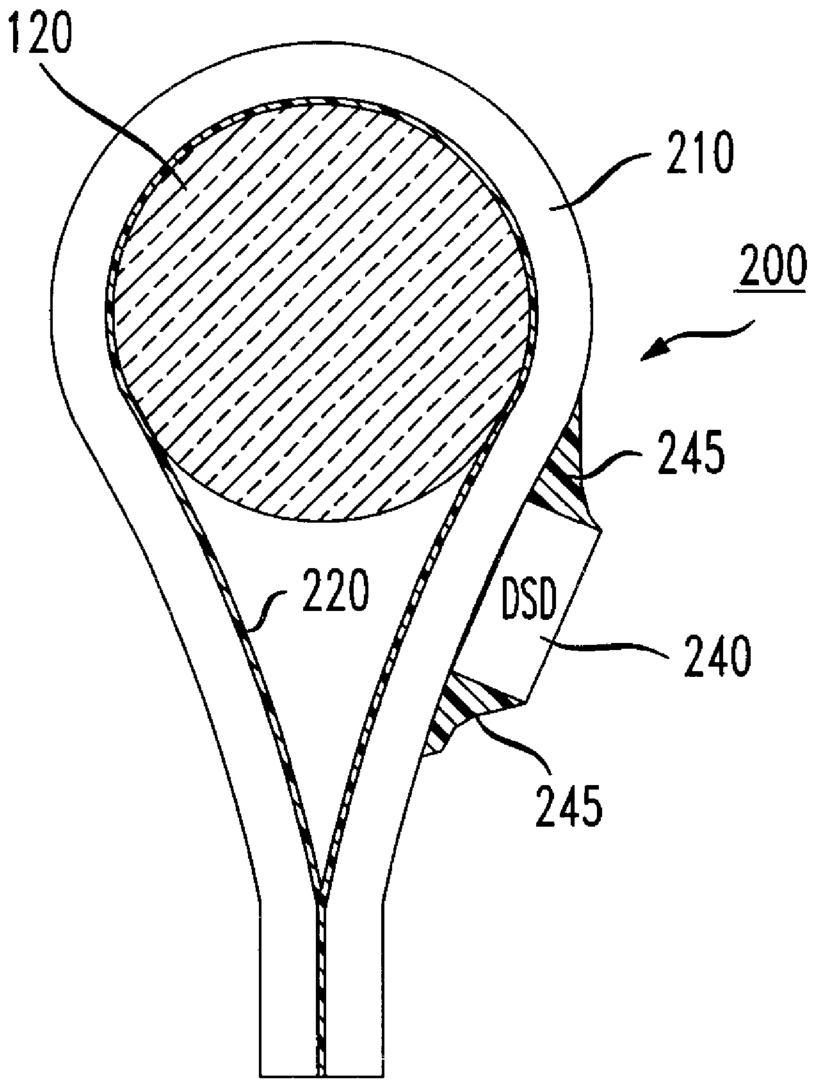
FIG. 4 shows an alternate embodiment of the data marker of FIG. 1.

The usefulness of the data marker 20 to provide information about signal-carrying members is not necessarily confined to splice cases. FIG. 4 illustrates an alternate preferred embodiment 200 of a data marker for attachment directly to a signal-carrying member, such as a cable 120. The data marker 200 comprises a carrier 210 which in FIG. 4 takes the form of a ribbon, having fastening means, such as an adhesive layer or strip 220 running along one of its major surfaces to allow wrapping around the cable 120. However, other types of fastening means could also be utilized to attach the carrier to the cable 120 other than adhesive. The carrier 210 mounts a data storage device 240 identical to data storage device 24 of FIG. 1. For example, a quantity of epoxy 245 could bond the data storage device 240 to the carrier 210. Alternatively, a separate housing (not shown) enclosing the data storage device 240 could be attached to the carrier 220 by rivets, or other mechanical fasteners.

The data marker 200 of FIG. 4 operates in exactly the same fashion as the data marker 20 of FIG. 1. A technician would initially program the data marker 200 with information about the cable 120 via a reader/writer, such as the reader/writer 30 of FIG. 1. Upon subsequent provisioning or other activity involving the cable 120, the technician would read the data marker to establish the current attributes of the cable, and then re-program the data marker as needed.

The foregoing describes a data marker for use with a signal-carrying member to for receiving and retaining information about the status of the member for output and for receiving and retaining status updates for subsequent output.

The above-described embodiments merely illustrate the principles of the invention. Those skilled in the art may make various modifications and changes that will embody the principles of the invention and fall within the spirit and scope thereof.

What is claimed is:

1. A data marker for use with a splice case that encloses at least a portion of a plurality of signal-carrying members spliced therein, comprising:

a carrier for mounting to the splice case; and a non-volatile data storage means mounted to said carrier for electronically receiving and electronically retaining information about the status of the splices between signal carrying members for output and for electronically receiving and electronically retaining status updates about such splices for subsequent output.

2. The data marker according to claim 1 wherein the non-volatile data storage means receives and outputs status information in an electronically connectionless manner.

3. The data marker according to claim 2 wherein the data storage means comprises:

a coil in which alternating current is induced by an external reader/writer;

a power circuit for converting the alternating current induced in the coil into direct current;

an electronic memory powered by said direct current from the power circuit for electronically receiving and electronically storing said status information and status updates;

capacitive data transfer means for transferring electrical charge; and an input/output circuit coupled to said memory for reading data therefrom and for placing a charge onto said capacitive data transfer means in accordance with said data, and for writing data into said memory in accordance with charge placed on said capacitive data transfer means.

4. A data marker for attachment about a one signal-carrying member, comprising:

a ribbon having an adhesive on one of its major surfaces to adhere the ribbon at least partially circumferentially about said signal carrying member; and a non-volatile data storage means mounted to said signal-carrying member by the ribbon for electronically receiving and electronically retaining information about the status of the member for output and for electronically receiving and electronically retaining status updates for subsequent output.

5. The data marker according to claim 4 wherein the non-volatile data storage means receives and outputs status information in an electronically connectionless manner.

6. The data marker according to claim 5 wherein the data storage means comprises:

a coil in which alternating current is induced by an external reader/writer;

a power circuit for converting the alternating current induced in the coil into direct current;

an electronic memory powered by said direct current from the power circuit for electronically receiving and electronically storing said status information and status updates;

capacitive data transfer means for transferring electrical charge; and an input/output circuit coupled to said memory for reading data therefrom and for placing a charge onto said capacitive data transfer means in accordance with said data, and for writing data into said memory in accordance with charge placed on said capacitive data transfer means.

7. The data marker according to claim 4 wherein the data storage means is mounted to said signal-carrying member by epoxy.

* * * * *